April 19, 1949.  R. C. SHIPLEY  2,467,600
CLAMP HAVING SPRING-PRESSED MOVABLE JAW ACTUATED
BY CAM-ADVANCED AND SPRING-RETRACTED
PRESSURE PLATE
Filed April 12, 1946

INVENTOR
ROBERT C. SHIPLEY
BY
ATTORNEY

Patented Apr. 19, 1949

2,467,600

UNITED STATES PATENT OFFICE 2,467,600

CLAMP HAVING SPRING-PRESSED MOVABLE JAW ACTUATED BY CAM-ADVANCED AND SPRING - RETRACTED PRESSURE PLATE

Robert C. Shipley, Kalamazoo, Mich.

Application April 12, 1946, Serial No. 661,686

2 Claims. (Cl. 81—26)

This invention relates to a quick acting, spring cushioned clamping device.

In operation my clamping device may be used to hold together workpieces of somewhat varying widths while maintaining substantially the same clamping pressure and without changing its adjustment.

In the manufacture of a wide number of articles, such as wooden boxes or furniture, it is necessary to clamp them together for holding while the glue hardens. In present practice this is usually done by applying to the article a screw adjusted clamp in which the box engaging jaws are brought together into holding position by suitable advancement of the screw. This is effective but in production work it consumes an undesirable amount of time in the adjustment of the screw. Various devices have been proposed by which this screw advancement may be made more rapid but this does not eliminate the requirement for individual adjustment of each clamp as it is applied to the box.

It is accordingly desirable to provide a clamp which may be moved into holding position by a single rapid movement but which will be sufficiently self-adjusting that it will automatically compensate for the variations in dimensions existing in the normal production of wooden articles without substantial variation in the clamping pressure, and hence eliminate the need for specific adjustment of the clamp for each article.

Therefore, the primary object of my invention is to provide a clamping device of the above character that may be clamped quickly onto successive workpieces without special adjustment for each and without substantially varying the pressure applied to each.

A secondary object is to provide a clamping device of the type indicated which is adjustable over a wide range for varying sizes of workpieces.

Other objects are to provide a strong and rigid device, with a clamping mechanism that is convenient to use, and, to provide such a mechanism which is reasonably economical to manufacture.

Other objects reside in details of construction, arrangement and operation hereinafter described and, for purpose of illustration but not of limitation, an embodiment of the invention is shown in the accompanying drawing, in which.

Figure 1:
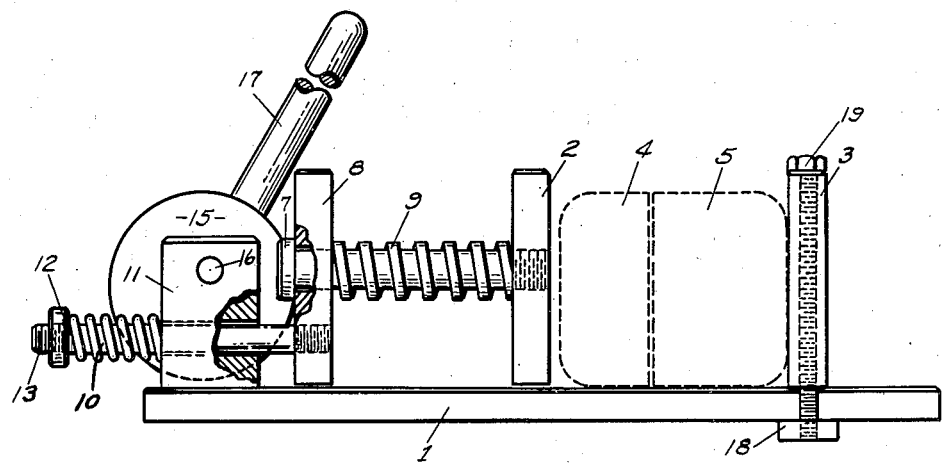
Figure 1 is a side elevation of the clamping device in open position, certain parts being broken away to show portions of the openings through which the spring studs slide.
Figure 2:
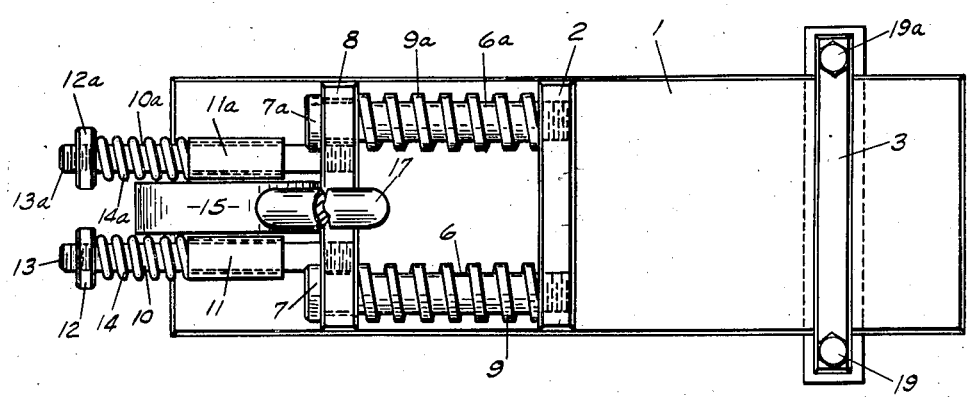
Figure 2 is a top plan view showing the general layout of the clamping mechanism.

Referring then to the drawings wherein like parts of the clamping mechanism shown are each designated by the same numerals in the several views, the clamping device there shown is mounted upon a base 1 having a movable clamping jaw 2 and stationary clamping jaw 3, between which the workpieces 4 and 5 may be quickly and easily placed and held. Said base may be supported in any convenient manner, as on a wheel or turntable, whereby a large number of these clamps may be easily and quickly presented for reception and release of workpieces as desired.

The guide pins 6 and 6a comprise studs provided with external screw threads received engagingly in internally threaded openings in a clamp jaw 2. These guide pins extend slidingly through suitable openings in a pressure plate 8 and are terminated by the heads 7 and 7a, respectively. The clearance between these pins and the walls of the openings receiving same is sufficient to permit both easy longitudinal movement and slight lateral movement as hereinafter mentioned in more detail. The guide pins 6 and 6a are embraced along their respective lengths between the clamping jaw 2 and the pressure plate 8 by the pressure springs 9 and 9a which urge the said plate and jaw apart. Movement in response to said urging is limited by the stud heads 7 and 7a.

The pull-back pins 10 and 10a are provided with external screw threads received engagingly in internally threaded openings in the pressure plate 8. The pull-back pins 10 and 10a extend slidingly through openings in the cam supporting blocks 11 and 11a, which blocks are mounted on the base 1 in any convenient manner. The clearance between these pins and the walls of the openings receiving same is sufficient to permit both easy longitudinal movement and slight lateral movement as hereinafter mentioned in more detail. Said pins are each provided, respectively, with internally threaded adjustable collars 12, and 12a turning on external screw threads 13 and 13a. The pull back springs 14 and 14a encircle the said pins 10 and 10a between collars 12 and 12a and the support blocks 11 and 11a and their tension may be adjusted by rotative adjustment of said collars. Acting through the pins 10 and 10a these springs hold the pressure plate 8 against a cam 15, which cam is supported pivotally at 16 by any conventional means between the support blocks 11 and 11a. The cam 15 is desirably provided with a handle 17 for easy operation.

The stationary jaw 3 extends somewhat beyond each side of the base 1 and is held in a selected position on the base 1 by a strap 18 extending under said base. This strap is provided with openings at each end for the reception of a pair of bolts, 19 and 19a, which extend through the jaw member 3 and engage suitably aligned internally threaded openings in the said strap member 18. This provides an easy method of adjustment for varying sizes of workpieces.

Rotation of the cam 15 counterclockwise from the position shown in Figure 1 causes the pressure plate 8 to move towards the workpieces 4 and 5, and in doing so it transmits its motion through the pressure springs 9 and 9a to the clamping jaw 2. When the clamping jaw 2 contacts the workpieces 4 and 5 it stops, but the pressure plate 8 continues to move forward under the continued urging of the cam 15. This places the pressure springs 9 and 9a under a substantial tension, which tension imposes a corresponding force onto the clamping jaw 2. By this, the workpieces 4 and 5 are held firmly in position, but they are so held entirely by the pressure of said springs 9 and 9a.

With the pressure plate 8 supported with respect to the base 1 solely by the pull-back pins, which in turn are supported with easy sliding clearance in the cam supporting block 11 and 11a, it is evident that a slight lateral movement of the pins within and with respect to their supporting blocks will be possible. The same is true of the guide pins 6 and 6a with respect to the pressure plate 8. Thus the movable jaw 2 will be sufficiently movable with respect to the clamp base 1 laterally as well as longitudinally, that its work engaging face can to a limited extent deviate readily from a plane perpendicular to its axis of longitudinal movement. This provides a self adjustment by which the said movable jaw 2 can engage without other adjustment such workpieces as may vary slightly from being exactly square, and yet as urged by said pressure springs impose an even pressure onto all parts of the contacted surface.

To release the clamp the cam is rotated from the engaging position in a clockwise direction as same appear in Figure 1 of the drawings by which the pressure plate 8 is permitted to move leftwardly due to the urging of the springs 14 and 14a operating through the pull-back pins 10 and 10a. This releases the pressure on the springs 9 and 9a and correspondingly releases the pressure on the clamping jaw 2. Near the end of its releasing travel leftward, as appearing in Figure 1, the pressure plate 8 will engage the heads 7 and 7a of the studs 6 and 6a and through them move the clamping jaw 2 releasingly and positively away from the articles 4 and 5 being held.

It will be evident that the adjustable but otherwise non-movable jaw 3 will be positioned with respect to the clamping jaw 2 so that the articles being clamped, such as box parts, may be inserted and removed into and from the clamping position between said jaws easily and without engagement by said jaws but that when the cam is actuated to move the pressure plate 8 forwardly the desired pressure will be imposed onto said parts. The magnitude of said pressure may be readily adjusted by relatively small adjustment in the position of the non-moving jaw 3.

It will thus be seen that the clamping device herein shown and described is adaptable for convenient use in a number of different ways, and while but one embodiment of the invention is shown and described, it is understood that certain details of construction shown may be altered or omitted without departing from the spirit of the invention as the same is defined in the following claims.

I claim:

1. A spring cushioned adjustable clamp, comprising: a base; a relatively fixed jaw adjustably supported by said base; a relatively movable jaw supported by said base and movable with respect thereto toward and away from said fixed jaw; a cam; a pair of blocks supported fixedly on and by said base and pivotally supporting said cam; a pressure plate positioned substantially parallel with said movable jaw and contacting said cam; a pair of pull-back pins threadedly engaging said pressure plate and each extending slidingly through an opening in one of said cam supporting blocks; a spring encircling each of said pull-back pins held at its one end by one of said cam supporting blocks and held at its other end by means adjustably supported by said pull-back pins; a pair of guide pins threadedly engaging said movable jaw and extending slidingly through said pressure plate; a spring encircling each of said guide pins and bearing at one of its ends against said movable jaw and at the other of its ends against said pressure plate urging said pressure plate and said movable jaw apart, and stop means on the end of each of said guide pins limiting such movement, whereby movement of said guide plate in clamping direction in responce to movement of said cam will transmit through said springs a clamping pressure onto said clamping jaw.

2. A spring cushioned adjustable clamp, comprising: a base; a relatively fixed jaw adjustably supported by said base; a relatively movable jaw supported by said base and movable with respect thereto toward and away from said fixed jaw; a cam; means supported on and by said base and pivotally supporting said cam; a pressure plate positioned substantially parallel with said movable jaw and contacting said cam; a pair of pull-back pins engaging said pressure plate and each extending slidingly through said means fixed to said base; a spring encircling each of said pull-back pins and held at its one end by said means fixed to said base and held at its other end by means adjustably supported by said pull-back pins; a pair of guide pins engaging said movable jaw and extending slidingly through said pressure plate; a spring associated with each of said guide pins and bearing at one of its ends against said movable jaw and at the other of its ends against said pressure plate urging said pressure plate and said movable jaw apart, and stop means limiting such movement, whereby movement of said guide plate in clamping direction in response to movement of said cam will transmit through said springs a clamping pressure onto said clamping jaw.

ROBERT C. SHIPLEY.

REFERENCES CITED

The following references are of record in the file of this patent:

UNITED STATES PATENTS

| Number | Name | Date |
|---|---|---|
| 922,338 | Root | May 18, 1909 |
| 1,652,802 | Smith | Dec. 13, 1927 |
| 2,410,453 | Mills | Nov. 5, 1946 |
| 2,411,790 | Hadley | Nov. 26, 1946 |

FOREIGN PATENTS

| Number | Country | Date |
|---|---|---|
| 426,837 | France | May 13, 1911 |
| 673,304 | Germany | Mar. 20, 1939 |